(12) United States Patent
Wang et al.

(10) Patent No.: US 10,394,725 B2
(45) Date of Patent: Aug. 27, 2019

(54) SYSTEM AND METHOD FOR DEVICE ASSEMBLY BASED ON COMPONENT CHARACTERISTICS STORED WITH THE COMPONENTS

(71) Applicant: DELL PRODUCTS, LP, Round Rock, TX (US)

(72) Inventors: Minchuan Wang, Austin, TX (US); Bhyrav M. Mutnury, Round Rock, TX (US); Stuart Allen Berke, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 220 days.

(21) Appl. No.: 15/362,431

(22) Filed: Nov. 28, 2016

(65) Prior Publication Data

US 2018/0150415 A1    May 31, 2018

(51) Int. Cl.
| | | |
|---|---|---|
| *G06F 13/10* | (2006.01) | |
| *G06F 13/16* | (2006.01) | |
| *G06F 9/445* | (2018.01) | |

(52) U.S. Cl.
CPC .......... *G06F 13/1668* (2013.01); *G06F 9/445* (2013.01); *G06F 9/44505* (2013.01); *G06F 2213/16* (2013.01)

(58) Field of Classification Search
None
See application file for complete search history.

(56) References Cited

U.S. PATENT DOCUMENTS

| | | | |
|---|---|---|---|
| 8,384,522 B2 * | 2/2013 | Macauley | G01S 5/14 340/10.1 |
| 8,841,560 B1 | 9/2014 | Roberts | |
| 2003/0007339 A1 | 1/2003 | Harris et al. | |

* cited by examiner

*Primary Examiner* — Cheng Yuan Tseng
(74) *Attorney, Agent, or Firm* — Larson Newman, LLP

(57) ABSTRACT

A process may involve assembling a device at a device assembler. The process may include receiving a set of components, where each component of the set of components may be associated with a respective memory storing a set of characteristics of the component. The process may include assembling the set of components into the device at the device assembler. The process may also include accessing each respective memory of the components to read the sets of characteristics stored in the respective memories, and determining from the sets of characteristics of the components the characteristics of the device.

20 Claims, 5 Drawing Sheets

SYSTEM AND METHOD FOR DEVICE ASSEMBLY BASED ON COMPONENT CHARACTERISTICS STORED WITH THE COMPONENTS

FIELD OF THE DISCLOSURE

The present disclosure generally relates to information handling systems, and more particularly relates to device assembly based on component characteristics stored with the components.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use. In addition, information handling systems can include a variety of hardware and software resources that can be configured to process, store, and communicate information and can include one or more computer systems, computer devices, graphics interface systems, data storage systems, networking systems, server devices, and mobile communication systems.

SUMMARY

A process may involve assembling a device at a device assembler. The process may include receiving a set of components, where each component of the set of components may be associated with a respective memory storing a set of characteristics of the component. The process may include assembling the set of components into the device at the device assembler. The process may also include accessing each respective memory of the components to read the sets of characteristics stored in the respective memories, and determining from the sets of characteristics of the components the characteristics of the device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
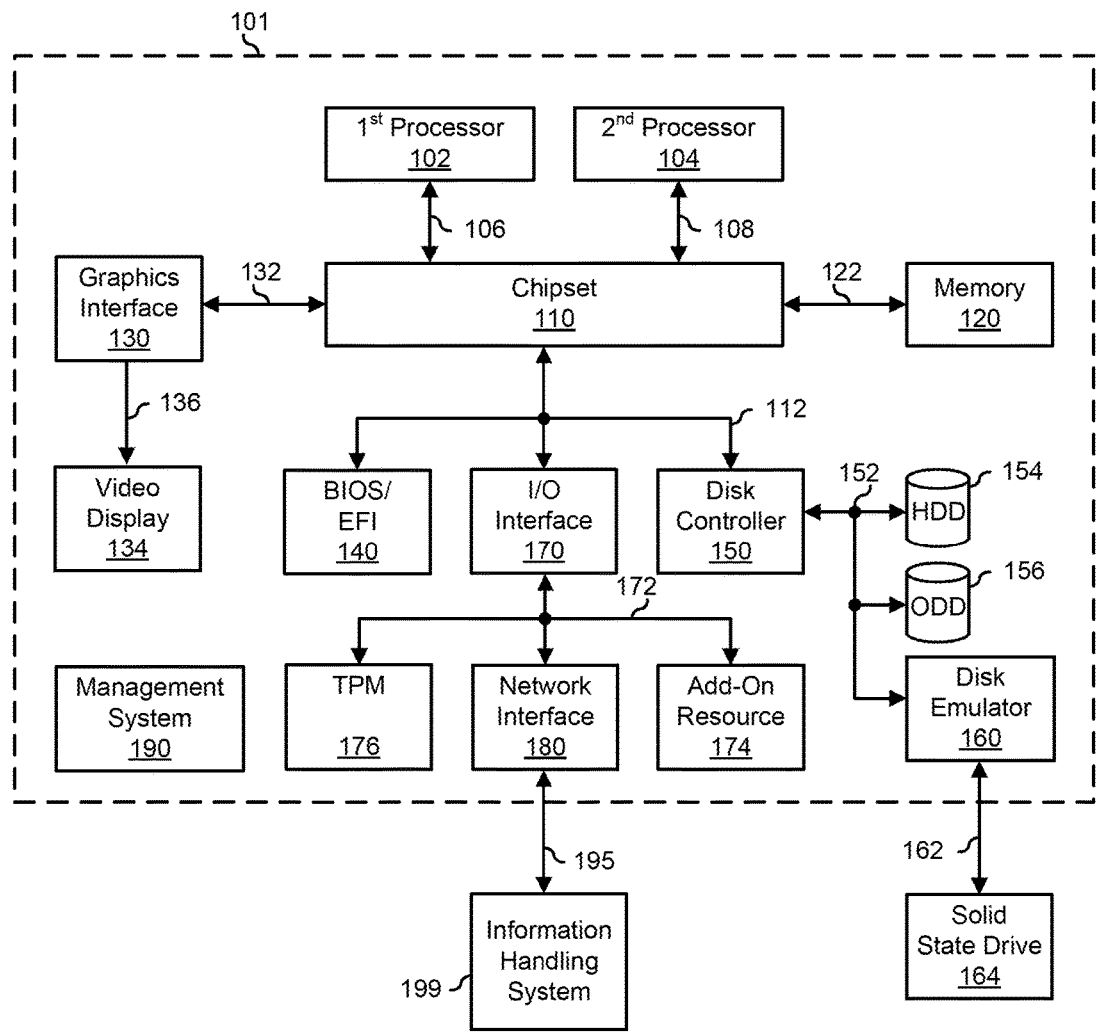
FIG. 1 is a block diagram of a general information handling system according to an embodiment of the present disclosure.

FIG. 1 illustrates a system 100 comprising connected information handling systems. Information handling system 101 and information handling system 199 are connected by connector device 195. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components. For example, computer devices may be connected by a computer connector device.

Information handling system 101 can include devices or modules that embody one or more of the devices or modules described above, and operates to perform one or more of the methods described above. Information handling system 101 includes a processors 102 and 104, a chipset 110, a memory 120, a graphics interface 130, includes a basic input and output system/extensible firmware interface (BIOS/EFI) module 140, a disk controller 150, a disk emulator 160, an input/output (I/O) interface 170, a network interface 180, and a management system 190. Processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 101 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 101, to provide drivers for the resources, initialize the resources, and access the resources. BIOS/EFI module 140 includes code that operates to detect resources within information handling system 101, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 101 via an external interface 162. An example of external interface 162 includes a USB interface, an IEEE 1394 (Firewire) interface, a proprietary interface, or a combination thereof. Alternatively, solid-state drive 164 can be disposed within information handling system 101.

Management system 190 provides for out-of-band monitoring, management, and control of the respective elements of information handling system 101, such as cooling fan speed control, power supply management, hot-swap and hot-plug management, firmware management and update management for system BIOS or UEFI, Option ROM, device firmware, and the like, or other system management and control functions as needed or desired. As such, management system 190 provides some or all of the functions and features of the management systems, management controllers, embedded controllers, or other embedded devices or systems, as described herein.

I/O interface 170 includes a peripheral interface 172 that connects the I/O interface to an add-on resource 174, to a TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 101, a device that is external to the information handling system, or a combination thereof.

Network interface 180 represents a NIC disposed within information handling system 101, on a main circuit board of the information handling system, integrated onto another component such as chipset 110, in another suitable location, or a combination thereof. Network interface device 180 provides a connection interface for connection to information handling system 199 with connector device 195.

In embodiments, information handling system 101 and information handling system 199 may be server devices or computer devices and connector device 195 may be a computer connector device. Connector device 195 may include multiple components such as cables, connectors, and printed circuit boards (PCBs) that together may provide one or more channels. System 100 may be a part of a larger system or device. For example, system 100 may be part of a larger device and information handling system 101 and information handling system 199 may be computer devices within the larger device or system in communication with one another.

Devices are assembled from sets of components, the characteristics of the components determining the characteristics of the assembled device. The characteristics of the device determine the functionality of the device.

In component manufacture, characteristics of individual components may be measured and associated with the respective individual component. For example, an individual component may be associated with, for example, by physical attachment, a respective non-volatile memory device which may be a part of the completed individual component. Respective individual characteristics of the individual components may be measured and then stored in the respective non-volatile memory device of the completed individual component.

When different components are assembled into a device or part of a device, the characteristics of the individual components of the device will determine the functionality of the device. To determine whether or to what extent an assembled (or to be assembled) device is functional for a desired functionality, the respective characteristics of the components of the device may be recovered from respective non-volatile memory devices of the components to determine the functionality of the device.

For example, a communication device such as a computer connector device providing a communication channel according to one or more communication standards between two computing devices, such as servers, may include individual components such as a controller component, a cable component, a midplane component, a connector component and a backplane component. Each of these individual components will have individual communications characteristics, referred to as signal integrity characteristics. Examples of signal integrity characteristics include impedance, crosstalk, and loss per inch. When, for example, an individual controller component, cable component, midplane component, connector component and backplane component are assembled into an individual computer connector device, the individual signal integrity characteristics of the components will determine the signal integrity characteristics of the individual computer connector device and the communication channel the computer connector device provides. In turn, the signal integrity characteristics of the individual computer connector device determine the functionality of the communication channel the computer connector device provides and thus the function of computer connector device itself. Thus, the characteristic of the individual components of the device determine the functionality of the device.

Building upon the example of computer connector device providing a communication channel according to one or more communication standards between two computing devices, the characteristics of the computer connector device and the communication channel provided by the computer connector device determine whether the computer connector device is functional to serve as a communication channel for different communication standards. For example, the Peripheral Component Interconnect Express (PCIe) standard may function optimally with a computer connector computer having a connector impedance of eighty-five Ohms, whereas the Serial Attached SCSI (SAS) standard (where SCSI is an acronym for Small Computer System Interface) may function optimally with a computer connector device having a connector impedance of one hundred Ohms. Thus, the impedance characteristics of the computer connector device and the communication channel provided by the computer connector device determine whether and to what extent the computer connector device is functional with different standards. For example, an individual computer connector device assembled from individual components that result in the individual computer connector device having an impedance of one hundred Ohms may be functional for communications according to the SAS standard but not the PCIe standard.

To determine the characteristics and thus functionality of an individual connector device with regard to different communication standards, signal characteristics of the individual components making up the connector are compiled to determine the signal characteristics of the connector device, for example, connector device impedance. To this end, component signal characteristics stored in the non-volatile memory device of individual components are accessed and used to determine the signal characteristics of the assembled connector and the communication channel provided by the connector device, for example, impedance. Based on the signal characteristics of the connector device, the functionality of the connector is determined, for example it is determined to what extent the connector device is operable for communication using different communication standards.

Figure 2:
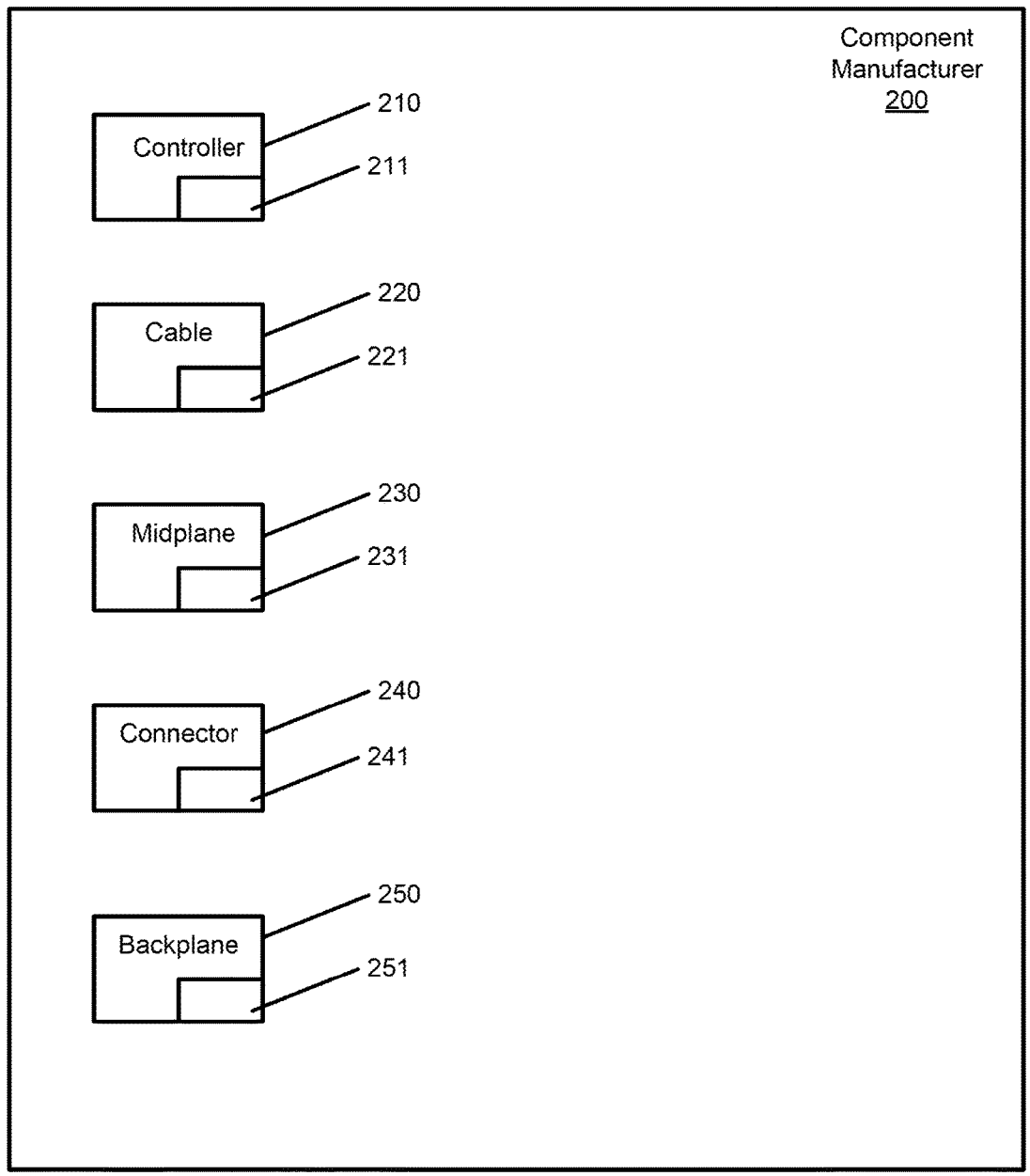
FIG. 2 illustrates components manufactured at a manufacturer.

In FIG. 2, at component manufacturer 200, controller, cable, midplane, connector, and backplane components are manufactured within manufacturing tolerances and as such characteristics of the components vary from individual component to individual component within manufacturing tolerances. Each component has associated with itself a non-volatile memory device such as an Electrically Erasable Programmable Read-Only Memory (EEPROM) or Radio-frequency Identification (RFID). The non-volatile memory device may form part of the associated component and as such be associated with the component by physical attachment.

For example, controller component 210 is manufactured at component manufacturer 200 within manufacturing tolerances and non-volatile memory 211 is attached to controller component 210. The individual characteristics of controller component 210 are measured by component manufacturer 200 and stored on associated non-volatile memory 211. For example, these characteristics may include signal integrity characteristics such as impedance, crosstalk, and loss per inch. Cable component 220 is manufactured at component manufacturer 200 within manufacturing tolerances and non-volatile memory 221 is attached to cable component 220. The individual characteristics of cable component 220 are measured by component manufacturer 200 and stored on associated non-volatile memory 221. For example, these characteristics may include signal integrity characteristics such as impedance, crosstalk, and loss per inch. Midplane component 230 is manufactured at component manufacturer 200 within manufacturing tolerances and non-volatile memory 231 is attached to midplane component 230. The characteristics of midplane component 230 are measured by component manufacturer 200 and stored on associated non-volatile memory 231. For example, these characteristics may include signal integrity characteristics such as impedance, crosstalk, and loss per inch. Connector component 240 is manufactured at component manufacturer 200 within manufacturing tolerances and non-volatile memory 211 is attached to connector component 240. The characteristics of connector component 240 are measured by component manufacturer 200 and stored on associated non-volatile memory 211. For example, these characteristics may include signal integrity characteristics such as impedance, crosstalk, and loss per inch. Backplane component 250 is manufactured at component manufacturer 200 within manufacturing tolerances and non-volatile memory 251 is attached to backplane component 250. The characteristics of backplane component 250 are measured by component manufacturer 200 and stored on associated non-volatile memory 251. For example, these characteristics may include signal integrity characteristics such as impedance, crosstalk, and loss per inch.

Thus multiple components such as controller, cable, midplane, connector, and backplane components, including controller component 210, cable component 220, midplane component 230, connector component 240, and backplane component 250, are manufactured at component manufacturer 200 and individual characteristics of individual components are measured and stored on associated non-volatile memories. The above manufacture of multiple components such as controller, cable, midplane, connector, and backplane components at component manufacturer 200 is by way of example, and different types of components and different components may be manufactured at different manufacturers.

When multiple components are received at a device assembler and assembled into devices at the device assembler, the individual characteristics of the components may be read from the non-volatile memories associated with individual components and used to determine the characteristics of an assembled device. The characteristics of the device may be determined prior to assembling the device, or subsequent to assembling the device. When the non-volatile memory device is a RFID, the characteristics of the components of the device may be determined prior to assembly or subsequent to assembly. When the non-volatile memory device is an EEPROM, the characteristics of the components of the device may be determined subsequent to assembly by providing a power supply to the assembled device and reading the characteristics of the components of the device from the EEPROMs attached to the component components of the device which will be supplied with power such that the EEPROMs may be read by code running on a processor attached to the device to read the EEPROMs of the components of the device.

Figure 3:
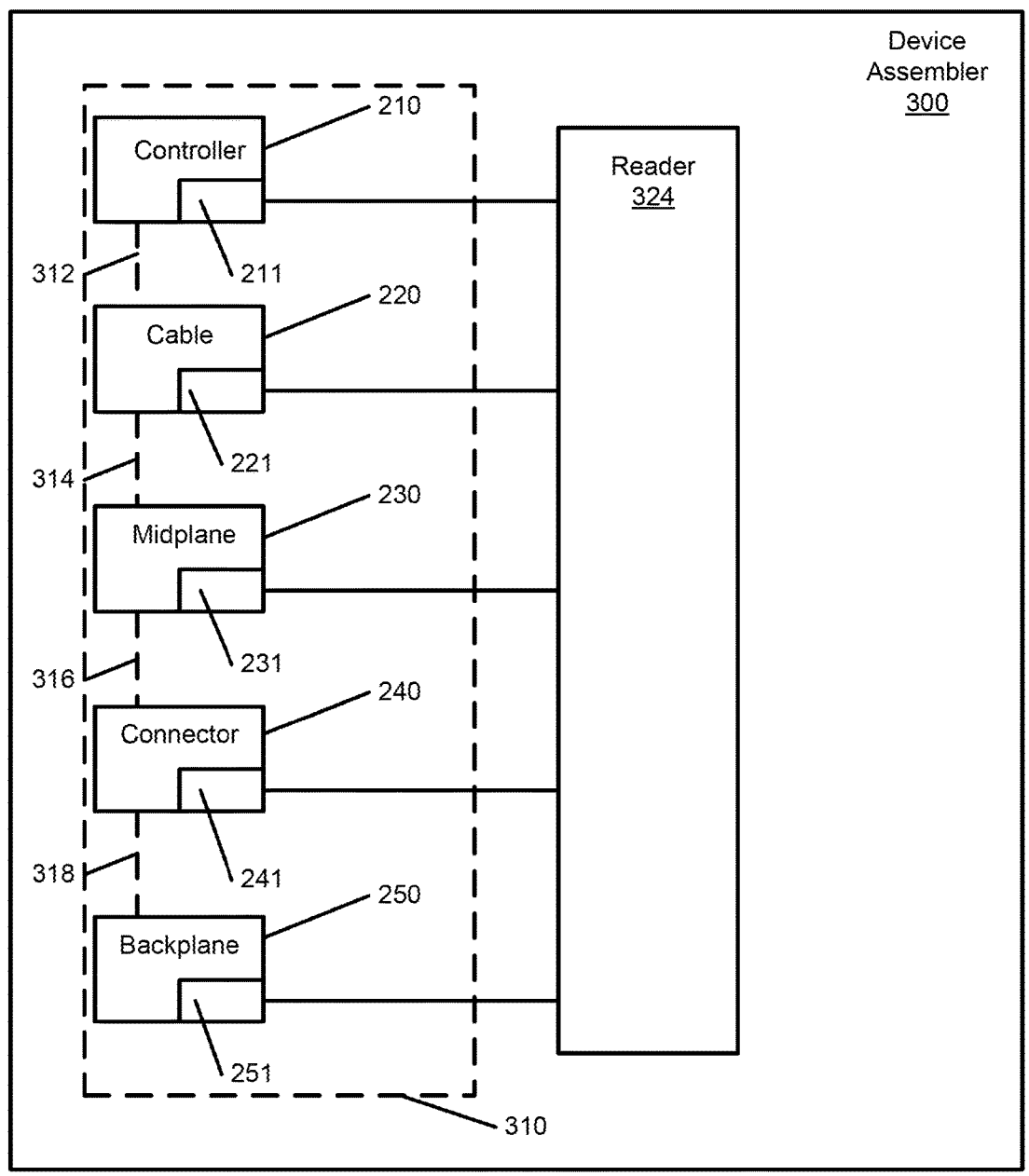
FIG. 3 illustrates a method for assembling a device from components at an assembler.

FIG. 3 shows components including controller component 210, cable component 220, midplane component 230, connector component 240, and backplane component 250 received at device assembler 300. At device assembler 300, controller component 210, cable component 220, midplane component 230, connector component 240, and backplane component 250 are assembled into a computer connector device 310 via assembly connectings 312, 314, 316, and 318 which connect controller component 210, cable component 220, midplane component 230, connector component 240, and backplane component 250 together to form assembled computer connector device 310. At device assembler 300, reader 324 is used to read characteristics, for example signal integrity characteristics including impedance, of components 210, 220, 230, 240, and 250 from respective non-volatile memories 211, 221, 231, 241, and 251. Reader 324 may include a processor and software running on the processor which when executed, causes the processor to access data such as signal integrity characteristics stored in non-volatile memory. The signal integrity characteristics and other characteristics of components 210, 220, 230, 240, and 250 may be compiled, by for example, software running on the processor of reader 324, to determine characteristics of computer connector device 310, including signal characteristics of computer connector device 310 such as impedance. The characteristics of computer connector device 310 are used to determine the functionality of computer connector device 310. For example, the determined impedance of computer connector device 310 and the communication channel provided by computer connector device 310 is used to determine which communication standards function with or over computer connector device 310.

If non-volatile memories 211, 221, 231, 241, and 251 are EEPROMS, then corresponding components 210, 220, 230, 240, and 250 are assembled into computer connector device 310 via connectings 312, 314, 316, and 318. Then assembled computer connector device 310 is provided with power such that non-volatile memories 211, 221, 231, 241, and 251 are provided with power such that memories 211, 221, 231, 241, and 251 may be accessed by reader 324 and the characteristics of corresponding components 210, 220, 230, 240, and 250 read. Signal integrity characteristics of components 210, 220, 230, 240, and 250 are then used to determine the characteristics and functionality of computer connector device 310. For example, functionality with regard to PCIe and SAS standards.

If non-volatile memories 211, 221, 231, 241, and 251 are RFIDS, then corresponding components 210, 220, 230, 240, and 250 may assembled into computer connector device 310 via connectings 312, 314, 316, and 318 and non-volatile memories 211, 221, 231, 241, and 251 accessed by reader 324 to read the characteristics of corresponding components 210, 220, 230, 240, and 250 to determine signal integrity characteristics of computer connector device 310.

If non-volatile memories 211, 221, 231, 241, and 251 are RFIDS, then non-volatile memories 211, 221, 231, 241, and 251 may be accessed by reader 324 to read the characteristics of corresponding components 210, 220, 230, 240, and 250 to determine signal integrity characteristics of computer connector 310 prior to assembling computer connector 310. If the determined signal integrity characteristics of computer connector 310 are desirable, components 210, 220, 230, 240, and 250 may be assembled via connectings 312, 314, 316, and 318 to produce assembled computer connector 310. If the determined signal integrity characteristics of computer connector 310 are not desirable, then computer connector 310 may not be assembled and components 210, 220, 230, 240, and 250 may be used in the assembly of different individual computer connectors.

The component manufacturer may be the device assembler. A device including components may in turn be a component of a further device including components, being a constituent component of the further device.

Figure 4A:
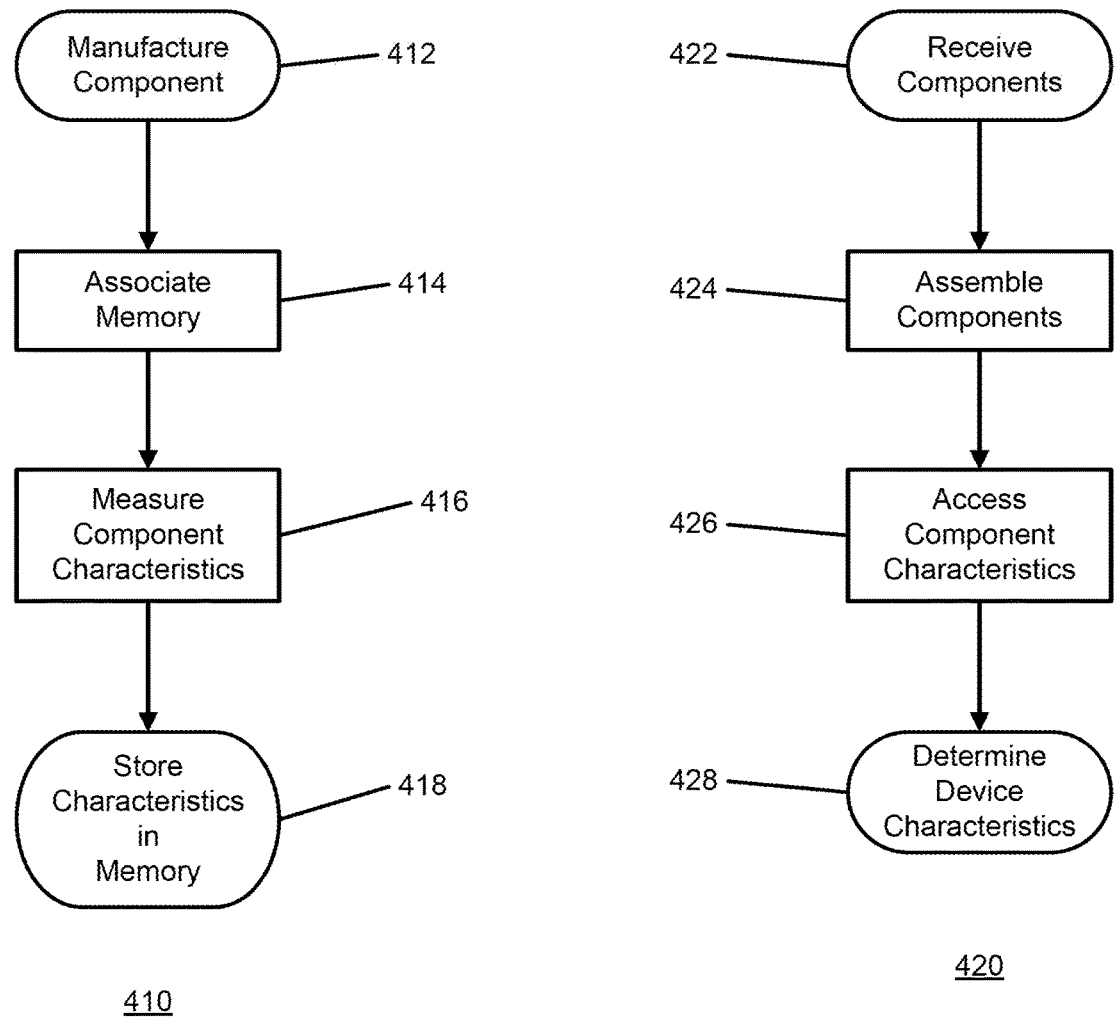
FIG. 4a illustrates processes for associating component characteristics with a component and for determining device characteristics of a device.

FIG. 4a illustrates a process 410 for associating component characteristics with a component, and a process 420 for determining device characteristics of a device. In process 410, at 412, process 410 is begun by manufacture of a component. The component may be manufactured by an component manufacturer. At 414, a non-volatile memory is associated with the component, for example, by physical attachment such that the memory is physically part of the component. The memory may be an EEPROM or RFID, for example. At 416, the individual characteristics of the individual component are measured by measuring the component with one or more measurement devices. Characteristics measured may include signal integrity characteristics such as impedance. At 418, the measured characteristics of the component are stored in the memory attached to the component and process 410 ends.

At 422, process 420 is begun when a set of components are received at a device assembler. Each component of the set has a respective memory attached thereto as described above with regard to process 410. At 424, the set of components are assembled by the device assembler into a device. At 426, the memories of the components of the set of components are accessed and the characteristics read, for example, by a reader device. When the memories are RFID memories, the memories may be accessed without being powered by an external power source. When the memories are EEPROMS, the memories are provided with power by a power source prior to being accessed. At 428, the set of characteristics read by the reader corresponding to the set of components forming the device are compiled to determine the characteristics and hence functionality of the device and process 420 ends.

Figure 4B:
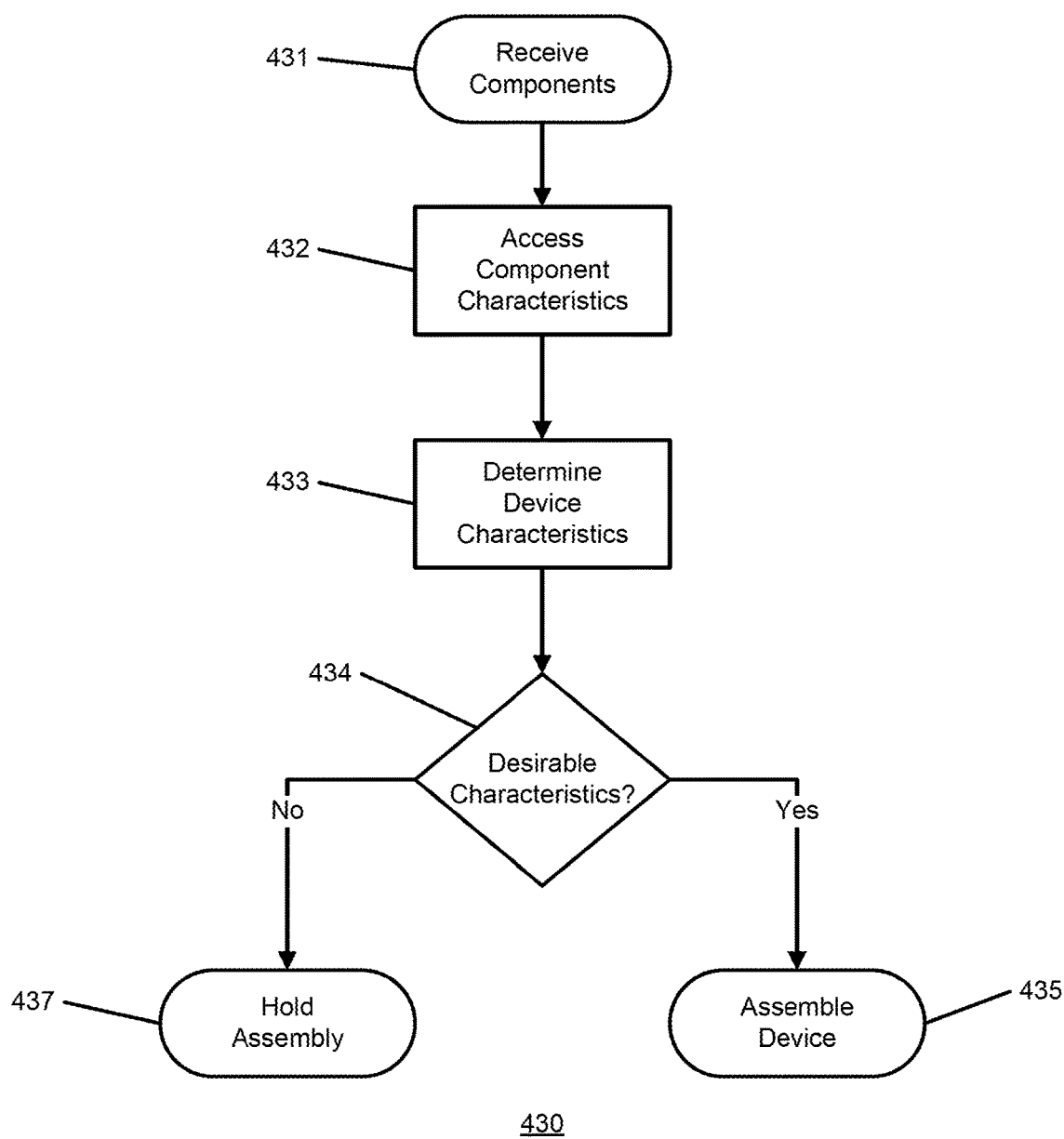
FIG. 4b illustrates a process for determining device characteristics of a device.

FIG. 4b illustrates a process 430 for determining device characteristics of a device. In process 430, at 431, process 430 is begun when a set of components are received at a device assembler. Each component of the set has a respective memory attached thereto as described above with regard to process 410. The memory may be an RFID such that (external) power need not be supplied to the memory before the memory is accessed to read characteristics. At 432, the memories of the components of the set of components are accessed and the characteristics read, for example, by a reader device. At 433, the set of characteristics read by the reader corresponding to the set of components are compiled to determine the characteristics and hence functionality of the device to be assembled from the set of components. At 434, it is determined if the device characteristics are desirable, that is, do the device characteristics render the device functional for a desired purpose, such as communication with different communication standards such as PCIe or SAS. If yes, the device characteristics are desirable, at 435, the device is assembled from the set of components and process 430 ends.

If no, and the device characteristics are undesirable such that the assembled device fails to be functional for a desired function, assembly of the device is held, that is, put on hold, and process 430 ends. When assembly of a device from the set of components is held such that assembly of the individual device from the individual components of the set of components is not performed, the individual components may be used to assemble other device and used to form other sets of components used to assemble such types of devices.

In embodiments, one or more components of a device may not have individual measured characteristics associated therewith. In such embodiments, nominal values may be presumed for or assigned to these components and the nominal values used in the determination of the device characteristics of the device.

Different combinations of impedances of individual components may or may not be acceptable for communication according to one or more standards based upon the succession of components. For example, a combination of successive high impedance, low impedance, and high impedance components may be undesirable, for example, due to signal reflections because of the differential in impedances across the successive components; however, a combination of successive low impedance, low impedance, and low impedance components may be acceptable for communication according to one or more standards because of the lack of signal reflection due to impedance variance across successive components.

Embodiments disclosed herein allow for increased manufacturing yield of acceptable devices within manufacturing tolerances. The acceptability of devices within manufacturing tolerances may be determined during or prior to assembly, allowing for devices presumed to meet manufacturing tolerances to be assembled, thereby increasing manufacturing yield of acceptable devices within manufacturing tolerances or parameters.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A process for assembling a device, comprising:
receiving a set of connector components, each one of the set of connector components associated with a respective physically attached memory storing a set of characteristics of the component that includes losses per inch;
assembling the set of connector components;
accessing, by a processor, each respective memory;
compiling the sets of characteristics stored in the respective memories; and
determining from the compiled sets of characteristics signal characteristics of the device, wherein the set of connector components are connected together as a peripheral component interconnect interface express (PCIe) connector device when the determined signal characteristics include a PCIe functionality.

2. The process of claim 1,
wherein the set of connector components are connected together as a serial attached small computer system interface (SAS) connector device when the determined signal characteristics includes an SAS functionality.

3. The process of claim 1, wherein the compiling the set of characteristics includes integrating the losses per inch in the respective memories of the connector components.

4. The process of claim 3, wherein the respective memories are electrically erasable programmable read-only memories (EEPROMS).

5. The process of claim 4, wherein the EEPROMS are provided with power to access the EEPROMS.

6. The process of claim 3, wherein the respective memories are radio-frequency identifications (RFIDs).

7. The process of claim 6, wherein the RFIDs are read without providing an external power supply to the RFIDs.

8. The process of claim 1, wherein the set of connector components includes a cable component, a connector component, and a midplane component.

9. The process of claim 8, wherein the sets of characteristics of the components further include impedances and crosstalk.

10. The process of claim 1, wherein the connected connector components form a PCIe cable that connects a network interface device to an information handling system.

11. The process of claim 10, wherein a functionality of the PCIe cable for operating according to a communication standard is determined from an impedance of channel.

12. A process performed with respect to a device, comprising:
receiving a set of connector components, each one of the set of connector components associated with a respective physically attached memory storing a set of characteristics of the component that includes losses per inch;
accessing each respective memory of the components to read the sets of characteristics stored in the respective memories;
determining from the sets of characteristics of the components characteristics of the device;
determining if the characteristics of the device include a peripheral component interconnect interface express (PCIe) functionality; and
assembling the set of components to form a PCIe connector device when the characteristics of the device include the PCIe functionality.

13. The process of claim 12, further comprising declining to assemble the device from the set of connector components in response to the determined characteristics of the device that does not include the PCIe functionality or a serial attached small computer system interface functionality.

14. The process of claim 12, wherein the determining includes determining if the device is functional for a functioning according to a standard based on the characteristics of the device.

15. The process of claim 12, wherein the respective memories are electrically erasable programmable read-only memories (EEPROMS) or radio-frequency identifications (RFIDS).

16. The process of claim 12, wherein the device is a computer connector device comprising at least one component from a group of components, the group of components comprising: a cable component, a connector component, and a midplane component.

17. The process of claim 16, wherein the sets of characteristics of the components include the losses per inch as signal integrity characteristics.

18. The process of claim 17, wherein the signal integrity characteristics further include impedance, and the characteristics of the device include an impedance of a channel provided by the device.

19. The process of claim 18, wherein a functionality of the device for operating according to a communication standard is determined from the impedance channel.

20. A process for assembling a computer connector device, comprising:
receiving a set of connector components, each component of the set of connector components associated with a respective physically attached memory storing a set of signal integrity characteristics of the component including an impedance value of each connector component;

assembling the set of components into to form the computer connector device;

accessing each respective memory of the components to read the impedance values stored in the respective memories;

compiling the read impedance values;

determining from the compiled impedance values an impedance of a channel provided by the computer connector device; and determining a functionality of the device for operating according to a communication standard from the impedance of the channel, wherein the set of connector components are connected together as a peripheral component interconnect interface express (PCIe) connector device when the determined functionality includes a PCIe functionality.

* * * * *

UNITED STATES PATENT AND TRADEMARK OFFICE
CERTIFICATE OF CORRECTION

PATENT NO. : 10,394,725 B2
APPLICATION NO. : 15/362431
DATED : August 27, 2019
INVENTOR(S) : Minchuan Wang et al.

Page 1 of 1

It is certified that error appears in the above-identified patent and that said Letters Patent is hereby corrected as shown below:

In the Claims

Column 10, Line 16: Claim 11: Please change "impedance of channel" to --impedance channel--

Signed and Sealed this
Tenth Day of March, 2020

Andrei Iancu
*Director of the United States Patent and Trademark Office*